United States Patent
Hamar

[11] Patent Number: 5,847,820
[45] Date of Patent: Dec. 8, 1998

[54] LASER APPARATUS FOR SENSING ROTATIONAL ORIENTATION AND LEVELNESS

[75] Inventor: Martin R. Hamar, Wilton, Conn.

[73] Assignee: Hamar Laser Instruments, Inc., Conn.

[21] Appl. No.: 742,025

[22] Filed: Nov. 1, 1996

Related U.S. Application Data

[60] Provisional application No. 60/011,581, Dec. 28, 1995.

[51] Int. Cl.$^6$ .............................. G01B 11/26; G01C 1/06; G01C 1/10
[52] U.S. Cl. ...................... 356/139.1; 356/143; 356/148
[58] Field of Search .............................. 356/139.1, 141.3, 356/141.5, 143, 148, 149

[56] References Cited

U.S. PATENT DOCUMENTS

| | | |
|---|---|---|
| 3,617,131 | 11/1971 | Taguchi . |
| 3,706,496 | 12/1972 | Geier et al. .............................. 356/149 |
| 4,185,503 | 1/1980 | Saito .......................................... 73/653 |
| 4,297,031 | 10/1981 | Hamar . |
| 4,382,680 | 5/1983 | Hamar . |
| 4,468,119 | 8/1984 | Hamar . |
| 4,483,618 | 11/1984 | Hamar . |
| 4,679,940 | 7/1987 | Hamar . |
| 4,714,344 | 12/1987 | Hamar . |
| 4,844,618 | 7/1989 | Hamar . |
| 5,108,177 | 4/1992 | Middleton . |
| 5,224,052 | 6/1993 | Hamar . |
| 5,302,833 | 4/1994 | Hamar et al. . |
| 5,307,368 | 4/1994 | Hamar . |
| 5,336,983 | 8/1994 | Watanabe . |
| 5,572,796 | 11/1996 | Breda ........................................ 33/283 |
| 5,684,579 | 11/1997 | Ohtomo et al. . |

Primary Examiner—Stephen C. Buczinski
Attorney, Agent, or Firm—Anthony J. Casella; Gerald E. Hespos; Ludomir A. Budzyn

[57] ABSTRACT

A laser apparatus is provided for sensing rotational orientation or the degree of levelness. The apparatus includes a photosensitive cell and a diode laser directing a laser beam toward the photosensitive cell. Both the diode laser and the photosensitive cell may be mounted in a rigid housing. A ball lens is rotatably mounted between the diode laser and the photosensitive cell such that the laser beam must pass through the ball lens to impinge upon the position sensitive cell. The ball lens is subject to limited movement within the housing. The control for limiting movement of the ball lens may be a circular raceway or a negative lens. Movement of the ball lens within the circular raceway or on the negative lens causes the laser beam to shift on the target. The position of the laser beam on the target is a function of the position of the ball lens and can be correlated to either the rotational orientation of the housing or the degree of levelness of the housing.

12 Claims, 1 Drawing Sheet

LASER APPARATUS FOR SENSING ROTATIONAL ORIENTATION AND LEVELNESS

This application claims the benefit of U.S. Provisional application Ser. No. 60/011,581 filed Dec. 28, 1995.

BACKGROUND OF THE INVENTION

1. Field of the Invention

The subject invention relates to laser apparatus, and particularly an apparatus for sensing the precise rotational orientation of an object and/or for sensing precisely how level an object is.

2. Description of the Prior Art

Laser emitters and photosensitive targets are widely used in industry for aligning machine components to one another. The prior art laser emitter projects a substantially straight beam toward the photosensitive target. The prior art target precisely identifies the location of the center of energy of the laser beam impinging thereon. Signals generated by the prior art photosensitive target can be used to accurately identify displacement errors and angular alignment errors between the prior art laser emitter and target.

The inventor herein also was the inventor in U.S. Pat. No. 4,468,119, which issued on Aug. 28, 1984 and which is entitled "PENTA-PRISM MODULE HAVING LASER ALIGNMENT ERROR DETECTION AND CORRECTION CAPABILITY". The apparatus shown in U.S. Pat. No. 4,468,119 directs a laser beam to a penta-prism that is operative to reflect an input laser beam internally, and to produce an output beam aligned at precisely 90 degrees to the input beam. The pentaprism of the apparatus shown in U.S. Pat. No. 4,468,119 can be rotated about the axis of the input beam. Thus, the output laser beam from the rotating penta-prism effectively sweeps a plane that is perpendicular to the input beam. This plane can be used as a reference to which the alignment and/or position of other objects can be compared. It often is desirable to have the plane swept by the rotating laser beam aligned substantially horizontally. For this purpose, the housing of the laser apparatus may be provided with a bubble level and a plurality of adjustment screws. A technician working the apparatus will selectively adjust the screws until the bubble level shows the apparatus being substantially level. Then, the plane swept by the rotating laser beam will be substantially horizontal.

The inventor herein also is the inventor in U.S. Pat. No. 5,307,368, which issued on Apr. 26, 1994 and is directed to "LASER APPARATUS FOR SIMULTANEOUSLY GENERATING MUTUALLY PERPENDICULAR PLANES". The laser apparatus shown in U.S. Pat. No. 5,307,368 may also use a rotating penta-prism and is operative to generate two or three planes that are perpendicular to one another. In many situations it is desirable to have one plane be aligned horizontally and at least one other plane aligned vertically. For these purposes, the housing of the apparatus may include a bubble level and adjustment screws as described above.

Many industrial machines have plural parts that optimally are aligned along a rotational axis. Alignment must be checked periodically to ensure efficient operation of the machine. Lasers have proved to be particularly useful and accurate for these alignment purposes. In particular, a laser emitter may be mounted at one location substantially on the rotational axis and the laser target may be mounted at another location substantially or effectively on the rotational axis. Apparatus for these purposes are shown in U.S. Pat. No. 4,483,618, which issued to Martin R. Hamar on Nov. 20, 1984 and U.S. Pat. No. 4,566,202, which issued to Martin R. Hamar on Jan. 28, 1986. A typical laser alignment system, including those shown in the above-referenced patents to Martin R. Hamar, requires the laser emitter and/or the photosensitive target to be positioned at each of several different rotational orientations at which readings will be taken. The preferred measurement operation includes taking readings at four rotational positions separated from one another by 90 degrees, namely, 12 o'clock, 3 o'clock, 6 o'clock and 9 o'clock. To facilitate this aspect of the laser alignment, the photocell target and/or the laser emitter may be provided with four bubble levels. The technician may be required to follow a set sequence wherein the bubble levels are sequentially employed to position the photosensitive target or the laser emitter at the four positions separated from one another by 90 degrees. A computerized system that calculates alignment errors and corrections may specify that the readings be taken in a particular order (e.g., 12, 3, 6 and 9 o'clock). If the technician inadvertently takes the readings in a different order, the computer will calculate errors and identify inappropriate adjustments to be made for correcting those errors. Thus, the great precision enabled by laser alignment equipment and computers can be off-set by taking readings in an incorrect order.

Structures adjacent to the machine tool being aligned may prevent the laser alignment system from being rotated through the preferred range of readings separated from one another by 90 degrees. For example, wires leading from the laser emitter or the photosensitive target may prevent complete rotation of the unit. Readings taken at other rotational orientations can be utilized to accurately measure alignment and determine corrections. However, the computer software may not be adapted to calculate alignment errors and necessary corrections at different rotational orientations. Additionally, the bubble levels generally would be improperly positioned for assuring the computer that the selected rotational orientation has been achieved.

A good quality bubble level can provide fairly accurate information as to angular orientation or the degree of levelness. However, the errors occurring during the manual aligning of a bubble level are far greater than the precision enabled by the laser emitter and photosensitive target. Thus, the high degree of precision enabled by the sophisticated laser equipment is partly off-set by inaccuracies of manually aligning a bubble level.

U.S. Pat. No. 5,302,833 of Martin R. Hamar and Carlos Araujo, utilizes internally disposed electronic or optical members to determine the rotational orientation of the laser emitter and/or target. For example, in one embodiment, a conductive disk is movably positioned between four conductive pins that are separated from one another by approximately 90 degrees. The disk is dimensioned and disposed to contact only two of the four pins, with the particular pins that are contacted being determined by the rotational orientation of the unit. Signals are sent from the laser unit to a computer to identify which pair of conductive pins are contacted by the disk. Thus, the computer is able to make alignment and correction calculations regardless of the order of the 12, 3, 6 and 9 o'clock readings. This apparatus, however, does not adjust calculations in accordance with the precise rotational orientation of the apparatus.

U.S. Pat. No. 5,302,833 shows another rotational orientation sensor in which a prismatic wedge is weighted on one side and is rotationally mounted in bearings. Gravitational effects on the weight will cause the wedge to rotationally move on the bearings depending upon the angular orientation of the housing. A laser beam is directed through the prismatic wedge and impinges on a laser target downstream of the wedge. The exact location of impingement is a function of rotational orientation of the wedge in the housing. A data interface subsystem of the laser alignment apparatus is operative to convert the X-Y coordinates of the reading of the target into a corresponding rotational orientation of the housing. Thus, accurate alignment readings can be obtained in situations where the preferred 12, 3, 6 and 9 o'clock readings cannot be taken. The rotationally mounted weighted prismatic wedge shown in U.S. Pat. No. 5,302,833 offers many possibilities. However, the bearings for rotationally mounting the weighted prismatic wedge can be fairly complex and costly and lead to a complicated assembly. Additionally, the bearings may be subject to gravitational influences and heat.

In view of the above, it is an object of the subject invention to provide a level sensor with sufficient accuracy to utilize the precision enabled by laser alignment systems. Specifically, it is an object of the subject invention to provide an accurate two-axis level device that is repeatable, absolute, rugged, fully linear and very reliable. Such a device optimally should have minimal drift with temperature and should be stable over long periods of time.

It is also an object of the subject invention to provide a rotational sensor that is gravity influenced and that functions to measure the angle of rotation (360°) on a horizontal shaft. The sensor should not have dead zones and should be capable of many rotations without "winding" up in a particular sequence. The gravity based rotation sensor optimally should not be costly and should not have complex assembly of complicated parts.

SUMMARY OF THE INVENTION

The subject invention uses a ball lens, a diode laser or LED, and a 2-axis position sensor. The ball lens images a diverging beam from a laser diode or an LED onto the surface of a position sensitive cell, such as a UST SC-10D-10. The optical axis of the laser/LED—position sensor is horizontal.

The ball lens may be contained in a housing that has a raceway similar in concept to the raceway of a ball bearing. The arrangement may be built in such a way that the ball lens optical axis is slightly shifted below the optical axis of the diode laser/position sensor axis. If the diode, raceway and position sensor are rotated as a unit the ball lens will "roll" in the raceway, always staying at the "6 o'clock" position. The focused spot on the position sensitive sensor will "orbit" in a circle as a result of rotating the entire apparatus about the optical axis. Readout of the X-Y position of the focused spot, with simple mathematics, will yield the true rotation angle. Such a sensor can be rotated any number of times about its optical axis and has full 360 degree responsivity with no dead zones and no loss of accuracy anywhere throughout a full rotation. It will also offer long term absolute rotational position.

A second embodiment of the invention involves a different combination of the same elements, namely the diode laser or LED, ball lens and position sensor. The primary differences are that the element that constrains the ball to roll is a plate of transparent glass or plastic having a concave face, such as a long radius negative lens. Additionally, the optical axis of the diode/position sensor is vertical. This second combination will yield a similar 2-axis device in that the ball can roll freely in either axis or both, but the X-Y positions of the focused spot will be used differently. As before, as the ball rolls it shifts the image of the diode laser/LED source on the position sensor. In this case the "X" axis reading will show "level" in the X direction, and the "Y" position will show level in the Y direction. If levelness about only one axis is required, the ball lens may be replaced by a cylindrical lens supported for rolling movement on a larger radius cylindrical concavity in a transparent glass or plastic, such as a negative lens.

The accuracy of this system is controlled by the selection of the radius of curvature of the negative lens. The longer the radius, the more accurate is the device but range will be reduced in proportion.

The cavity of both devices may be filled with methyl alcohol, ether or other viscous liquid which acts as a dampening fluid to reduce mechanical oscillations of the ball as it rolls. The devices will operate, however, entirely satisfactorily without any such fluid in the ball cavity.

An embodiment using sapphire ball lenses, as opposed to ordinary glass, is preferred. The higher index of refraction will permit the ball to focus far more satisfactorily when immersed in one of the dampening fluids mentioned above.

An ordinary glass ball lens will also work very well. The device could be designed with air or a gas as the dampening fluid and hence an ordinary glass ball could also be used effectively.

A further option using a ball lens or a cylinder lens in a level may pendulously suspend the ball lens or cylinder lens above the position sensor and in line with the diode laser for LED. As with the previous embodiments, the pendulous suspension will cause the ball lens or cylinder lens to move in response to gravity and to thereby shift the point of impingement of the laser beam on the position sensor. This embodiment avoids the need to use a negative lens or other such means for rollably receiving the ball lens or cylindrical lens.

DETAILED DESCRIPTION OF THE PREFERRED EMBODIMENTS

Figure 1:
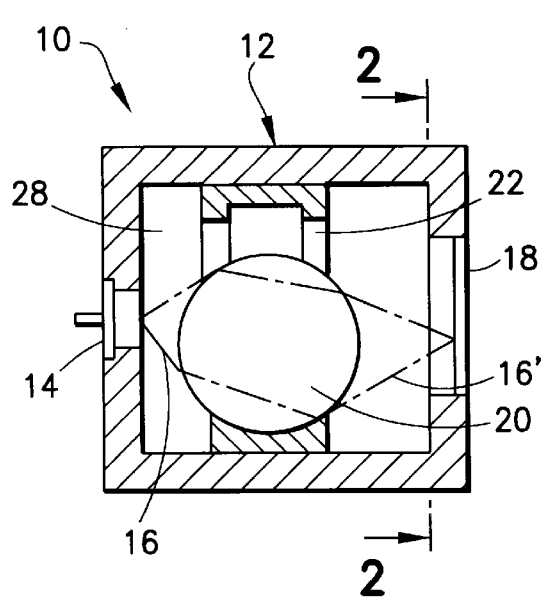
FIG. 1 is a cross-sectional view taken along the longitudinal axis of a laser apparatus in accordance with the subject invention.

A rotation sensor in accordance with the subject invention is identified generally by the numeral 10 in FIG. 1. The sensor 10 includes a housing 12 with a diode laser 14 projecting into the housing 12 and is aligned to emit a laser beam 16 substantially along the rotational axis of the housing. A two-axis position sensitive cell 18 is mounted in the opposite end of the housing 12 and in a position to be impinged upon by the laser beam 16. The cell 18 is operative to sense the location of the center of energy of the laser beam 16 impinging thereon.

The rotation sensor 10 further includes a ball lens 20 mounted in a circular raceway 22. The ball lens 20 will move circularly in the raceway 22 as the housing 12 is rotated about the axis of the laser beam 14. This rotation will cause the laser beam 16' passing out of the ball lens 20 to trace an orbit on the position sensitive cell 18 as shown schematically in FIG. 2. The precise location of the laser beam 16' on the position sensitive cell 18 is calculated by a computer connected to the position sensitive cell 18 and correlates to a particular rotational orientation of the housing. The housing 12 may be filled with a dampening fluid 28, such as methyl alcohol, to reduce mechanical oscillations of the ball lens 20 as it rolls in the circular raceway 22.

Figure 2:
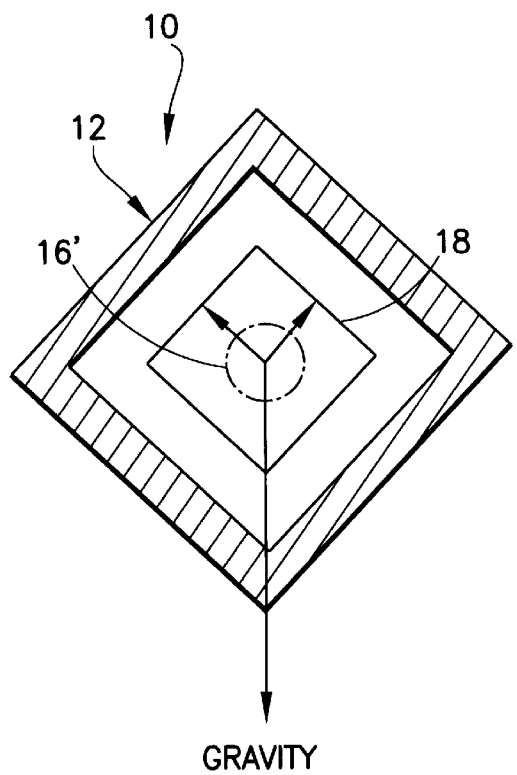
FIG. 2 is a cross-sectional view taken along line 2—2 in FIG. 1 and showing the laser apparatus rotated from a FIG. 1 orientation.
Figure 3:
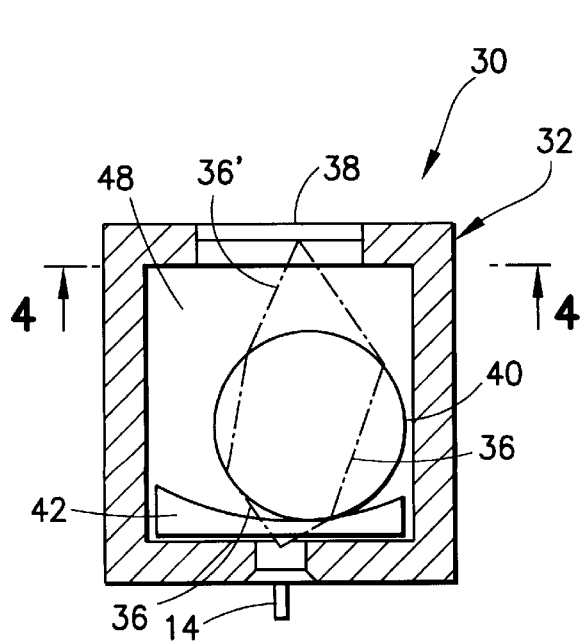
FIG. 3 is a cross-sectional view of an alternate embodiment showing the laser apparatus adapted as a level sensor.
Figure 4:
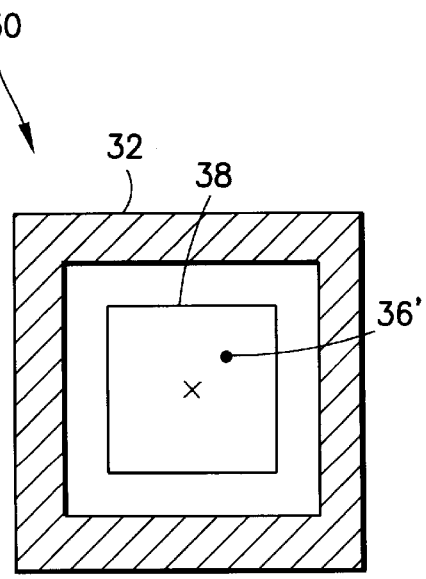
FIG. 4 is a cross-sectional view taken along line 4—4 in FIG. 3.

The second embodiment is illustrated in FIG. 2 and includes the same or similar components as a level sensor. More particularly, the level sensor is identified generally by the numeral 30 in FIG. 3 and includes a housing 32 with a diode laser 34 mounted therein. The diode laser 34 is operative to produce a laser beam 36. A position sensitive cell 38 is mounted in the housing 32 at a location opposite the diode laser 34. The position sensitive cell 38 is operative to sense the location of the center of energy of a laser beam impinging thereon. A ball lens 40 is disposed between the diode laser 34 and the position sensitive cell 38. In place of the circular raceway 22 shown in FIG. 1, the level sensor 30 includes a negative lens 42 as a spherical raceway. The ball lens 40 can rotate into different positions on the negative lens 42 depending upon the angular orientation of the housing. The relative position of the ball lens 40 on the negative lens 42 will cause the output laser beam 36' to shift on the target, as shown schematically in FIG. 4. The exact position of the output laser beam 36 on the position sensitive cell 38 is, therefore, a precise measurement of the degree of levelness.

As in the preceding embodiment, the housing 32 may be filled with a dampening fluid 48 such as methyl alcohol.

While the invention has been described with respect to a preferred embodiment, it is apparent that various changes can be made without departing from the scope of the invention as defined by the appended claims.

I claim:

1. A laser apparatus comprising a light source, a position sensor disposed for receiving light from the light source and for generating signals indicative of a location thereon impinged by the light source; a ball lens disposed between the light source and the position sensor for adjusting the location of impingement of light from the light source on the position sensor in accordance with the location of impingement of light on the ball lens; and means for constraining the ball lens for controlled movement between the light source and the position sensor.

2. The apparatus of claim 1, wherein the light source is a light emitting diode.

3. The apparatus of claim 1, wherein the light source is a laser diode.

4. The apparatus of claim 1, wherein the position sensor is a two-axis target.

5. The apparatus of claim 1, wherein the means for constraining the ball lens comprises a concave lens between the ball lens and the position sensor.

6. The apparatus of claim 1, wherein the means for constraining the ball lens comprises a circular track for permitting rolling movement of the ball lens substantially in a plane orthogonal to a rotational axis of the apparatus.

7. The apparatus of claim 1, wherein the means for constraining the ball lens for controlled movement comprises a pendulous support for said lens.

8. The apparatus of claim 1, wherein said ball lens is disposed in a housing, said housing being substantially filled with a transparent liquid for dampening movement of said ball lens.

9. The apparatus of claim 1, wherein the means for constraining the ball lens is fixedly disposed relative to both the light source and the position sensor.

10. The apparatus of claim 1, further comprising a substantially rigid housing; said light source, said position sensor and said means for constraining the ball lens all being fixedly mounted to the housing and fixedly disposed relative to one another, the ball lens being movably disposed in the housing for controlled movement relative to the housing, the light source, the position sensor and the means for constraining the ball lens.

11. A laser apparatus comprising:

a laser diode for emitting a laser beam;

a two-axis target disposed for receiving the laser beam from the laser diode and for generating signals indicative of a location therein impinged by the laser beam;

a ball lens disposed between the laser diode and the two-axis target for adjusting the location of impingement of the laser beam from the laser diode on the two-axis target in accordance with location of impingement of the laser beam on the ball lens; and a concave lens between the ball lens and the two-axis target for permitting the ball lens to undergo controlled movement between the laser diode and the two-axis target.

12. A laser apparatus comprising:

a laser diode for emitting a laser beam;

a two-axis target disposed for receiving the laser beam from the laser diode and for generating signals indicative of a location therein impinged by the laser beam;

a ball lens disposed between the laser diode and the two-axis target for adjusting the location of impingement of the laser beam from the laser diode on the two-axis target in accordance with location of impingement of the laser beam on the ball lens; and a ball track for permitting rolling movement of the ball lens substantially in a plane orthogonal to a rotational axis for the apparatus for permitting constrained and controlled movement of the ball lens between the laser diode and the two-axis target.

* * * * *